April 6, 1943. N. F. FRETTER 2,316,059
SEALING MEANS
Filed June 19, 1941 2 Sheets-Sheet 1

INVENTOR.
Nathan F. Fretter
BY
Geo. B. Pitts
ATTORNEY.

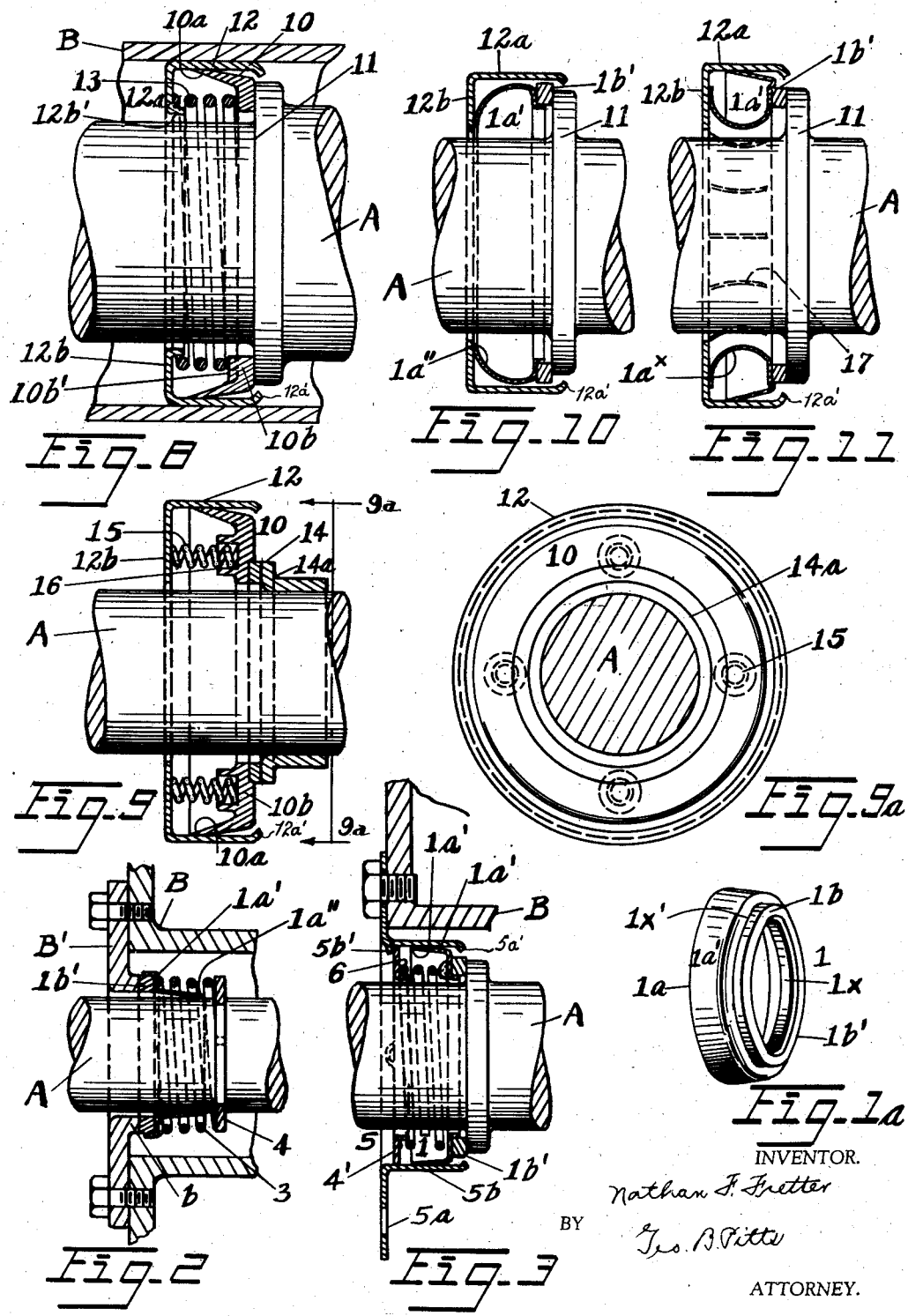

Patented Apr. 6, 1943

2,316,059

UNITED STATES PATENT OFFICE 2,316,059

SEALING MEANS

Nathan F. Fretter, Royal Oak, Mich.

Application June 19, 1941, Serial No. 398,793

10 Claims. (Cl. 286—7)

This invention relates to sealing means arranged between relatively rotatable members for preventing flow or leakage of fluids due to gravity, capillary attraction or difference in pressure and for excluding dirt, grit and other foreign matter.

One object of the invention is to provide an improved sealing means adapted to be mounted between and have sealing engagement with the walls of inner and outer relatively rotatable members, to prevent flow or leakage from one side of the sealing means, of a fluid, in a liquid or gaseous state, due to gravity, capillary attraction or difference in pressure between the opposite sides of the sealing means.

Another object of the invention is to provide an improved sealing means comprising a minimum number of parts which are capable of economical manufacture and ready assembly.

Other objects of the invention will be apparent to those skilled in the art to which my invention relates from the following description taken in connection with the accompanying drawings, wherein Fig. 1 is a fragmentary sectional view of inner and outer members having between them a sealing means embodying my invention.

Figs. 2 and 3 are fragmentary sectional views of different embodiments of the invention.

Figs. 8 and 9 are fragmentary sectional views of sealing means of the type shown in Fig. 4, but showing different forms of construction.

Fig. 9a is a section on the line 9a—9a of Fig. 9.

Figs. 10 and 11 are fragmentary sectional views showing other forms of construction.

Figure 1:
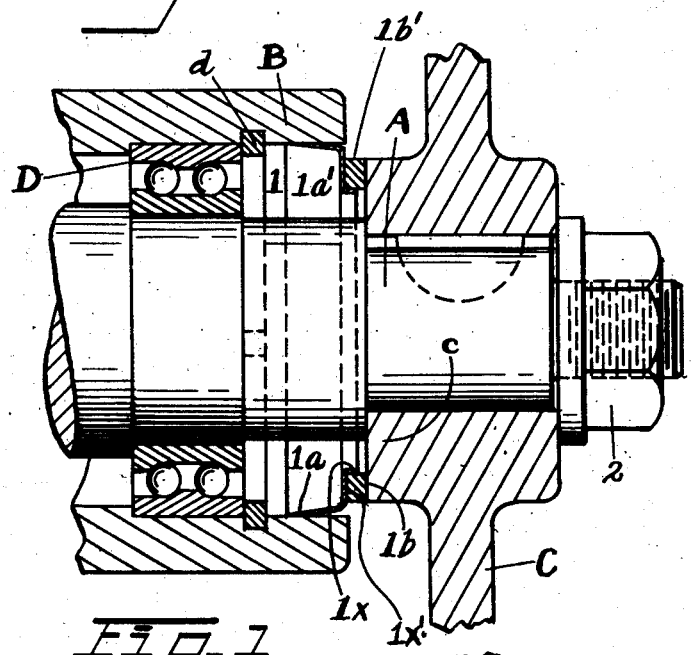
Fig. 1a is a perspective view of the sealing element.

In the drawings, referring particularly to Figs. 1 and 1a, 1 indicates as an entirety an annulus which forms a sealing member or sealing means between the walls of inner and outer members A, B, one of which is driven in any desired manner. The annulus consists of a side wall 1a flared or inclined laterally so that its periphery at one end may sealingly engage the adjacent surface of one member and an annular wall 1b at its opposite end arranged to sealingly engage a suitable annular surface provided on the other member. In these views the annulus 1 is shown as formed of two suitably connected elements, one being formed of thin resilient sheet metal 1a' and having a side wall which is normally inclined outwardly or laterally throughout its circumference and is of such size that when the element is positioned in the member B, as shown, the side wall is compressed inwardly and hence is tending to assume its normal position so that the free circumferential edge of the side wall sealingly engages the member B under pressure. The other element consists of a ring 1b', preferably formed of bronze and having sealing engagement with a wall provided on the other member, as later set forth. Due to the resiliency of the metal of which the element 1a' is formed, its side wall has at all times a sealed relation with the inner surace of the member B to prevent leakage; but where the medium, either liquid or gaseous, in the member B is under pressure, such pressure supplements the resiliency of the metal of the member 1a' to force the side wall thereof outwardly circumferentially and hence insures more positive seal between it and the member B. In this form of construction, the opposite end of the element 1a' is provided with a flange 1x which is shaped to form a seat 1x' for the ring 1b', the latter by preference being soldered in its seat.

In Fig. 1, the inner member or shaft A is provided outwardly of but adjacent to the outer end of the outer member B with a power transmitting device C, which is secured on the shaft A by a nut 2. In this arrangement, the side wall of the element 1a flares laterally outwardly and sealingly engages the inner surface of the outer member B and the ring 1b' sealingly engages the inner side of the hub c of the power transmitting device C, the effect of which is to seal the space between the two members A, B. In this arrangement, the inner surface of the device C takes the place of a collar on the shaft A. It will be noted that this construction of sealing means occupies minimum space longitudinally of the members A, B; accordingly, where the inner member A is provided with a power transmitting device, the sealing means permits the provision of a suitable bearing D adjacent the end of the outer member but inwardly of the sealing means. As shown, the bearing D is held in position by a split ring d. In the arrangement shown in Fig. 1, if fluid in the space between the members A, B, is under pressure, such pressure may be utilized to maintain the ring 1b' in sealing engagement with the device C and also help maintain the outer end of the side wall of the element 1a' in sealing engagement with the member B. Where the fluid in this space is not under pressure, and it is desirable to provide a more positive sealing relation between the ring 1b' and the wall with which it engages, a suitable spring may be provided to exert pressure upon the ring 1b'. For example, in Fig. 1 the spring would be mounted between the ring d and the seat for the ring 1b'.

In Fig. 2, the side wall of the element 1a' is flared laterally inwardly, as shown at 1a'', the resiliency of the metal serving to normally maintain the circumferential free end of the side wall 1a'' in sealing engagement with the wall of the member A. In this arrangement the outer member B has secured to it a collar B' the inner portion of which is provided with an inwardly extending flange b, the circumferential end edge thereof providing a wall with which the ring 1b' sealingly engages. 3 indicates a coiled spring interposed between a suitable abutment 4 on the shaft A and the seat for the ring 1b' to normally maintain the ring 1b' under pressure against the wall b. The abutment 4 preferably consists of a split ring seated in an annular groove or recess formed in the shaft A.

Fig. 3 illustrates a different form of construction wherein the sealing means 1 are mounted in a housing indicated as an entirety at 5. The housing 5 consists of an annular member, formed of sheet metal whereby it may be readily stamped out, having an outer wall 5a suitably bolted to the end wall of the outer member B and an inturned side wall 5b in which the sealing means 1 is mounted. In this form of construction, the side wall of the sealing element 1a' sealingly engages the side wall 5b and the ring 1b' sealingly engages a circumferential wall on the shaft A, the ring being maintained under pressure against this wall by a spring 6 interposed between the seat for the ring 1b' and an abutment 4'. The abutment 4' preferably consists of an annular section formed of sheet metal whereby it may be readily stamped out in a well known manner. The side wall 5b is formed with a plurality of indentations 5b' which provide a seat for the abutment 4'.

Figure 4:
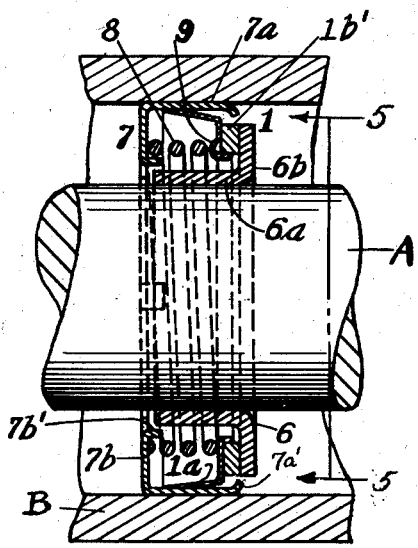
Fig. 4 is a fragmentary sectional view of a modified form of construction.
Figure 5:
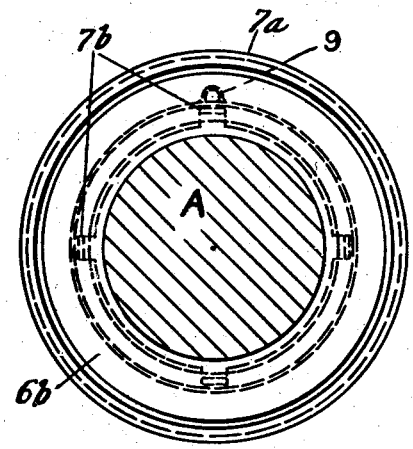
Fig. 5 is a sectional view on the line 5—5 of Fig. 4.
Figure 6:
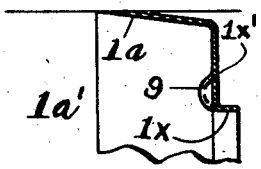
Fig. 6 is a fragmentary section of the sealing element, enlarged.
Figure 7:
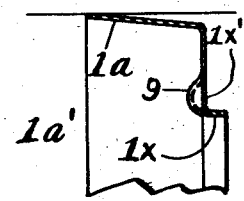
Fig. 7 is a view similar to Fig. 6, but showing a slight modification.

Fig. 4 illustrates a form of construction which may be positioned at any desired location longitudinally of the members A, B. In this form of construction, the sealing means 1 are mounted in a housing comprising an inner member 6' and an outer member 7. The inner member 6' consists of a side wall 6a pressed onto the shaft A and having at one end an outwardly extending flange 6b with which the sealing element or ring 1b' sealingly engages. The outer member 7 consists of a side wall 7a pressed on the inner wall of the member B and provided at that end remote from the flange 6b with an inwardly extending flange 7b. As shown, the outer end of the side wall of the sealing element 1a sealingly engages the side wall 7a and the flange 7b serves as an abutment for a spring 8, which normally tends to press the element 1b' against the flange 6b. The flange 7b is preferably provided with a plurality of in-turned lugs 7b' arranged to engage the adjacent end convolution of the spring 8 and support it concentrically to the shaft A. The opposite end of the spring 8 may be inserted under a lug 9 embossed in the bottom wall of the sealing element 1a' (see Figs. 6 and 7) so that the spring, annulus 1, member B and outer member 7 may have a fixed relation. The outer circumferential end of the side wall of the element 1a' may be ground down to a thin edge as shown in Fig. 6 or provided with a flat terminating edge as shown in Fig. 7.

Fig. 8 shows a different form of sealing means consisting of a single member 10 having a circumferential side wall 10a terminating in a thin edge at its outer end and at its opposite end an inwardly extending wall 10b which sealingly engages the inner side of an annular wall 11 on the shaft A. The side wall 10a sealingly engages the side wall 12 of a housing member 12a which is pressed on the inner surface of the member B. The housing member 12a is provided with an inturned flange 12b, which forms an abutment for a spring 13, the spring normally tending to press the wall 10b against the wall 11. The flange 12b is provided with an in-turned collar 12b' which engages the adjacent end convolution of the spring 13 to support it in concentric relation to the housing member 12a. The opposite end of the spring 13 is preferably connected to a lug 10b' provided on the wall 10b.

Figs. 9 and 9a show a form of construction similar to that shown in Fig. 8 except that the wall 10b of the sealing member 10 sealingly engages a flange 14 provided on a sleeve 14a which has a pressed-on relation to the shaft A and instead of using a coiled spring in surrounding relation to the shaft A, I provide a plurality of springs 15 spaced around the shaft between the flange 12b and wall 10b, the latter being formed with recesses 16 in which the adjacent ends of the springs 15 seat.

Figs. 10 and 11 show forms of construction wherein the wall of the sealing element 1a' is extended for engagement with the flange 12b of the housing member 12a whereby such extension may serve as a spring to yieldingly maintain the sealing ring 1b' in engagement with the wall 11 on the shaft A. For example, as shown in Fig. 10, the side wall 1a'' of the sealing element 1a' is of curvilinear shape in cross section and extends throughout its circumference upwardly and inwardly, its marginal end portion having sealing engagement with the flange 12b of the housing member 12a. In Fig. 11, the inner circumferential end of the sealing element 1a is extended upwardly and outwardly, having a curvilinear shape in cross section, as shown at 1a$^x$, its marginal end portion having engagement with the flange 12b of the housing member 12a. The wall 1a$^x$ may be slitted from its outer or free end inwardly any desired distance, as shown at 17.

Where the sealing means are combined with a housing, the outer end of the latter may be provided with an inturned circumferential flange, as shown at 5a' in Fig. 3, 7a' in Fig. 4 and 12a' in Figs. 8, 9, 10 and 11, arranged to extend inwardly of the adjacent end of the sealing means whereby the parts may be held together as an assembly.

To those skilled in the art to which my invention relates many changes in construction and widely differing embodiments of the invention will be apparent without departing from the spirit and scope thereof. My disclosures and the description herein are purely illustrative and not intended to be in any sense limiting.

What I claim is:

1. A sealing device adapted to be mounted between inner and outer relatively rotatable members, comprising an annulus formed of thin resilient metal and having a radially extending flange and a substantially conically shaped side wall, said side wall extending substantially axially of said members relative to said flange for engagement with the wall of said outer member, the resiliency of the metal serving to maintain the outer end portion of said side wall in normal yielding contact with the wall of said outer member, a sealing ring secured to the flange of said annulus and arranged to sealingly engage the adjacent surface of the inner member, and means for holding said sealing ring in engagement with the surface of said inner member.

2. In a sealing device, the combination with inner and outer members one of which rotates relative to the other, of a radially extending wall fixed to each of said members, an annulus surrounding said inner member and formed of thin resilient metal, said annulus comprising a radially extending flange and a substantially conically shaped side wall, said side wall extending substantially axially of said members relative to said flange for engagement with said outer member, the resiliency of the metal normally maintaining the outer circumferential end portion of said side wall in sealing engagement with the inner surface of said outer member, a ring carried by said flange and sealingly engaging said radially extending wall fixed to said inner member, and a spring between the radially extending wall fixed to said outer member and said flange normally tending to move said ring toward the radially extending wall fixed to said inner member.

3. A sealing means as claimed in claim 2, wherein means are provided for connecting the spring to said flange and annular wall carried by said outer member, whereby said annulus, ring and spring have substantially fixed relation to said outer member.

4. In a sealing device, the combination with inner and outer members one of which rotates relative to the other, of a radially extending wall carried by each of said members, an annulus surrounding said inner member and comprising a ring arranged to sealingly engage the adjacent surface of the radially extending wall on said inner member and an axially extending diverging side wall the outer circumferential edge of which sealingly engages the inner surface of said outer member, and spring means between the radially extending wall carried by said outer member and said ring and normally tending to yieldingly maintain the latter in sealing engagement with the radially extending wall carried by said inner member.

5. A sealing means as claimed in claim 4, wherein means are provided for connecting said spring to said ring and the annular wall carried by said outer member whereby said annulus and spring have substantially non-rotative relation to said outer member.

6. A seal assembly for mounting between relatively rotatable members, comprising an annulus fixedly related to one of said members and having a side wall and a radially disposed wall, an annular wall fixedly related to the other member, a pair of sealing elements, one element consisting of a ring formed of solid, non-yieldable material arranged to sealingly engage said last mentioned annular wall and the other element being annular and formed of thin sheet metal having an unbroken surface rigidly connected at one end to said ring and having an annular side wall slidably and sealingly engaging one of the walls of said annulus, said assembly including spring means for normally maintaining said ring in yielding engagement with said annular wall.

7. A seal for assembly between relatively rotatable members, comprising two parts, one part consisting of a ring formed of solid non-yieldable material and adapted to sealingly engage an annular wall on one of said members and the other part being formed of relatively thin resilient metal rigidly connected at one end to said ring and consisting of an annulus having an outwardly flaring unbroken side wall arranged to be constricted circumferentially inwardly when assembled between said members, whereby said side wall due to the resiliency of the metal thereof normally engages a surface of said other member under pressure.

8. In sealing means, the combination with inner and outer relatively rotatable members and an annular wall on said inner member, of a housing consisting of a side wall fixedly related to said outer member and an inturned annular wall, and an annular sealing device formed of thin resilient metal and having a laterally flaring side wall the outer end portion of which engages one of the walls of said housing and provided at its inner end with an annular reinforcement formed of solid non-yieldable material sealingly engaging said annular wall, the resiliency of the metal of said device serving normally to maintain the outer end portion of its flaring side wall in engagement with the wall of said housing under pressure.

9. In sealing means, the combination with inner and outer relatively rotatable members and an annular wall on said inner member, of a housing consisting of a side wall fixedly related to said outer member and an inturned flange and a sealing device formed of thin resilient metal and having a reinforcement sealingly engaging said annular wall, a wall outwardly of said reinforcement sealingly engaging the side wall of said housing and a separate wall engaging said flange, the resiliency of the last mentioned wall serving normally to maintain said reinforcement in engagement with said annular wall.

10. A sealing means assembly adapted to be mounted between inner and outer relatively rotatable members, one of said members comprising a housing having a side wall arranged to be fixedly related to the inner wall of the outer member and an inturned annular wall and the other member having an annular wall, comprising a pair of sealing elements, one element consisting of a ring formed of non-yieldable material arranged to sealingly engage one of said annular walls and the other element consisting of an annulus formed of thin resilient metal and rigidly connected at one end to said ring and sealingly engaging the other annular wall at its opposite end, the side wall of said annulus being expanded laterally into curvilinear form in cross section throughout its circumference, whereby said annulus, due to the resiliency of the metal thereof serves normally to yieldingly maintain said ring in engagement with the adjacent annular wall and its said opposite end in engagement with the other annular wall.

NATHAN F. FRETTER.